3,303,219
(2-PHENYL-ALLYL)-AMINES

Willis C. Keith, Lansing, and Robert P. Zmitrovis, Park Forest, Ill., assignors to Sinclair Research, Inc., New York, N.Y., a corporation of Delaware
No Drawing. Filed Mar. 10, 1965, Ser. No. 438,785
5 Claims. (Cl. 260—570.5)

This application is a continuation-in-part of application S.N. 153,673 to Keith et al. filed November 20, 1961 and now abandoned.

This invention is directed to new compositions of matter which are (2-phenyl-allyl) amines, and to a method for their manufacture. The compositions have the formula:

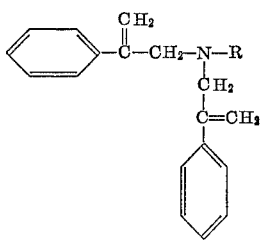

wherein R is hydrogen or a monovalent hydrocarbon radical e.g. of 1 to 20 carbon atoms. The R group may be saturated or unsaturated, substituted or unsubstituted, straight or branched chain, or cyclic, including aromatic. Advantageously, R is phenyl or alkyl, such as lower alkyl, for example of 1-4 or more carbon atoms, but preferably it is a 2-phenyl allyl radical. The phenyl group may be substituted, as with one or more lower alkyl groups. R may also be a polyalkylene polyamine radical having the formula $[(CH_2)_xN(R'')]_yR''$ wherein $x$ is 2 to 3, $y$ is 1 to 50, preferably 1 to 10, and R'' is hydrogen or

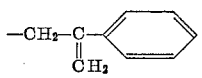

The non-primary amines of this invention are useful for curing epoxy resins and as cross-linking agents for high molecular weight polymers. Also the amines can be used as corrosion inhibitors in mineral lubricating oil. Illustrative of the compositions of this invention are the compounds tri-(2-phenyl-allyl) amine,

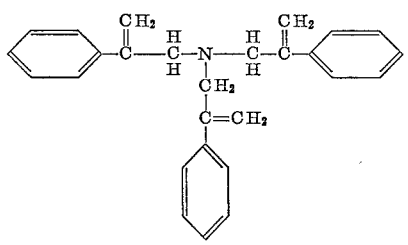

N,N,N',N'-tetra (2-phenyl-allyl) ethylene diamine

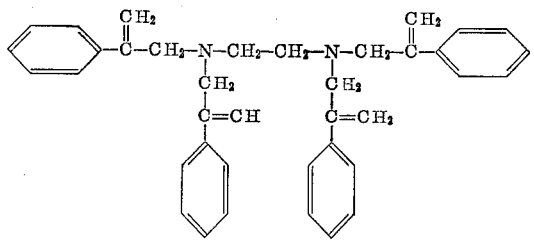

N,N,N',N'',N''-penta (2-phenyl-allyl) diethylene triamine

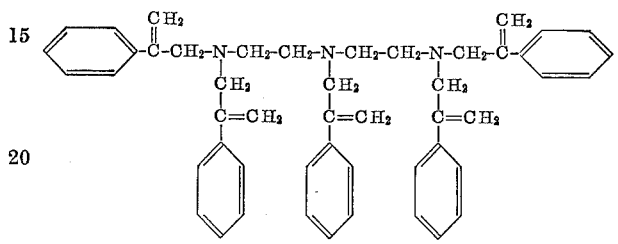

and N,N,N',N'',N''',N'''-hexa - (2-phenyl-allyl) triethylene tetramine

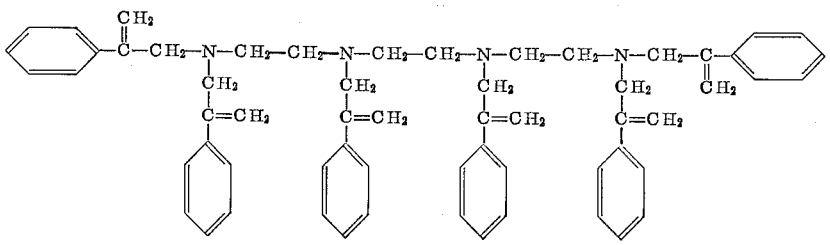

The corresponding amines can also be made in which at least one nitrogen atom has attached to it two

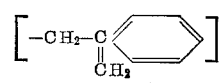

groups, and the other nitrogen atoms have at least one such group or hydrogen attached to them. Mixtures of such amines can also be produced.

The non-primary amines of this invention, as well as primary 2-phenyl-allyl amines, may be formed by the reaction of 2-phenyl-allyl chloride with ammonia or an amine, $RNH_2$ in which R has the significance noted above. Such primary amines as methylamine, ethylamine, laurylamine, cyclohexylamine, or aniline, or such polyamines as piperazine, the polyalkylene polyamines of 5 to 100 carbon atoms, having the formula $H_2N[(CH_2)_xNH]_yH$ wherein $x$ is 2 to 3 and $y$ is 1 to 50, preferably 1 to 10, such as ethylene diamine, diethylene triamine, tetraethylene pentamine may be employed. The reaction of 2-phenyl-allyl chloride with the above-noted primary amines will result in the formation of (2-phenyl-allyl) alkyl amines such as di(2-phenyl-allyl) amine, di(2-phenyl-allyl) methylamine, di(2-phenyl-allyl) ethylamine, di(2-phenyl-allyl) laurylamine, di(2-phenyl-allyl) cyclohexylamine, and di(2-phenyl-allyl) phenylamine.

The reaction takes place in the liquid phase at a temperature of about 50 to 150° C. The reaction can be conducted by adding the ammonia solution or amine starting material slowly to a solution of the chloride in an inert solvent, such as an alkanol of 1 to 4 carbon atoms. Also the reaction can be conducted by adding sufficient chloride to the ammonia or amine, and preferably an excess of the chloride over the stoichiometric requirement can be used. When ammonia is employed, the aqueous solution conveniently has a concentration of about 1 to 20% and the amount of ammonia employed depends upon the product desired. If a primary amine is to be the principal product, a large excess of NH₃ is generally employed due to competing reactions.

The following examples of the invention are illustrative only and not limiting.

25 grams of a feedstock comprising 75% 2-phenyl-allyl chloride, the remainder being 1-chloro-2-phenyl-1-propene, was charged under pressure to a 300 ml. Aminco shaker bomb which contained 100 milliliters of a 6% aqueous $NH_4OH$ solution which had been heated to 140° C. with agitation. This temperature was maintained for 1 hour, after which the bomb was cooled to room temperature. The product was worked by the addition of benzene and the oil phase separated. The aqueous phase was extracted with ethyl ether, the ether was removed on a steam bath and the residue added to the benzene extract. The benzene was removed from this material by distillation in a helices-packed column. The bottoms was an oily liquid containing solids which were crystalline and which were removed by filtration. Six grams of crystalline tri-(2-phenyl-allyl) amine were recrystallized from ethanol and had the following characteristics:

|  | Found | Theory |
|---|---|---|
| Melting Point ° C | 128 |  |
| Mol. Wt. (Mass Spec.) | 365 | 365 |
| Percent C | 88.7 | 88.7 |
| Percent H | 7.4 | 7.4 |
| Percent N | 3.7 | 3.8 |

The filtrate was again charged to the micro still and the unreacted 1-chloro-2-phenyl-1-propene was recovered (about 6 grams) along with 3 grams of an unidentified oil. The 6 gram bottoms from the still was a crystalline compound determined to be the quaternary ammonium salt.

The corresponding secondary and tertiary amines are made by the same general procedure but various amines are substituted for the ammonia solution. The following table shows some of the amines which can be substituted and the products obtained by their substitution:

Amine:                            Product
(1) Ethylene diamine — N,N,N',N' - tetra(2-phenyl-allyl)ethylene diamine.
(2) Diethylene triamine — N,N,N',N'',N'' - penta (2-phenyl-allyl)diethylene triamine.
(3) Triethylene tetramine — N,N,N',N'',N''',N''' - hexa-(2 - phenyl - allyl) triethylene tetramine.
(4) Tetraethylene pentamine — N,N,N',N'',N''',N'''',N'''' - hepta (2 - phenyl - allyl) tetraethylene pentamine.
(5) Piperazine — N,N' di (2-phenyl - allyl) piperazine.
(6) Methylamine — di - (2-phenyl - allyl) methyl amine.
(7) Ethylamine — di - (2-phenyl - allyl) ethyl amine.
(8) Laurylamine — di-(2-phenyl - allyl) laurylamine.
(9) Cyclohexylamine — di - (2-phenyl - allyl) cyclohexylamine.
(10) Aniline — di-(2-phenyl - allyl) aniline.

It is claimed:
1. Amines of the formula:

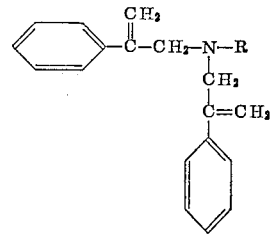

wherein R is selected from the group consisting of hydrogen, phenyl, alkyl of 1 to 20 carbon atoms, 2-phenyl-allyl and substituted polyalkylene polyamine of the formula $[(CH_2)_xNR'']_yR''$ wherein $x$ is 2 to 3, $y$ is 1 to 10 and R'' is selected from the group consisting of hydrogen and

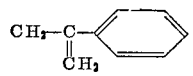

2. Tri-(2-phenyl-allyl) amine.
3. N,N,N',N'-tetra-(2-phenyl-allyl) ethylene diamine.
4. N,N,N',N'',N''-penta-(2-phenyl-allyl) diethylene triamine.
5. N,N,N',N'',N''',N''' hexa (2-phenyl-allyl) triethylene tetramine.

References Cited by the Examiner
UNITED STATES PATENTS
2,172,822    9/1939    Tamele et al.

CHARLES B. PARKER, *Primary Examiner.*
ROBERT V. HINES, *Assistant Examiner.*